July 23, 1968   R. L. SYLVESTER ET AL   3,393,807
CARRIER FOR RADIAL GREEN TIRES
Filed Oct. 20, 1965   5 Sheets-Sheet 2

INVENTOR.
ROWLAND L. SYLVESTER
JACK H. MORROW
CARL C. STEVASON
BY
ATTORNEY

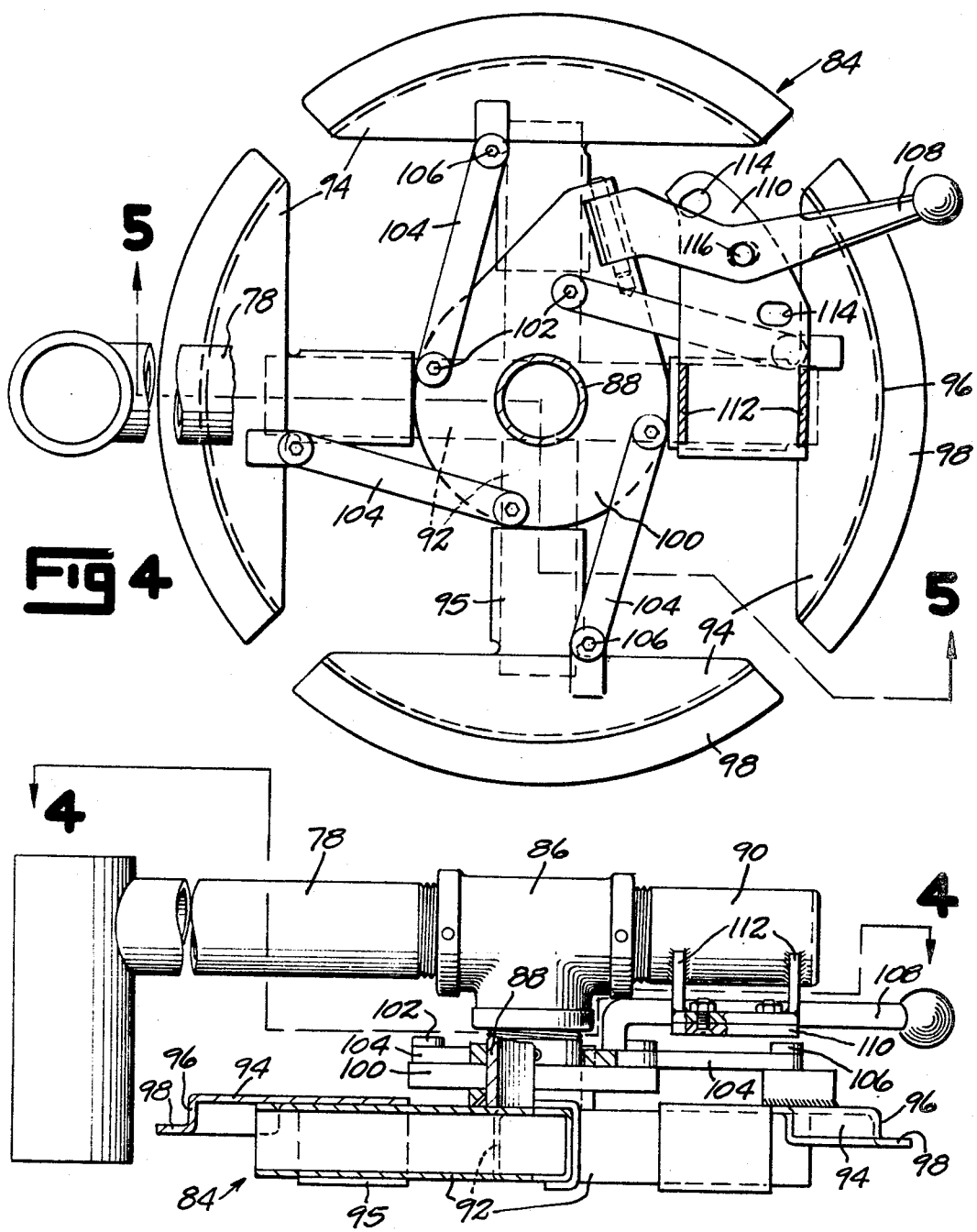

July 23, 1968
R. L. SYLVESTER ETAL
3,393,807
CARRIER FOR RADIAL GREEN TIRES
Filed Oct. 20, 1965
5 Sheets-Sheet 4
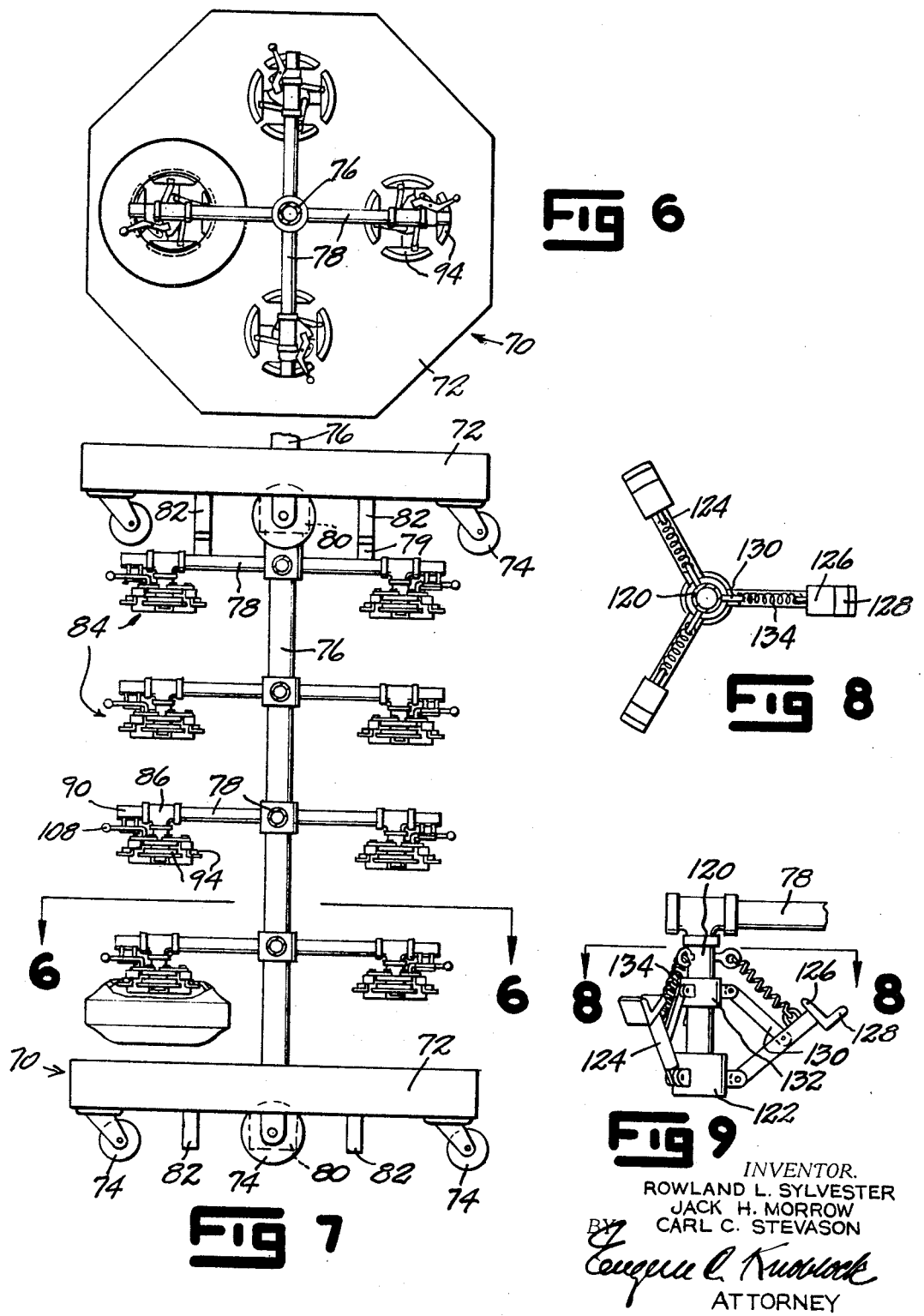
INVENTOR.
ROWLAND L. SYLVESTER
JACK H. MORROW
CARL C. STEVASON
BY Eugene C. Kudwick
ATTORNEY

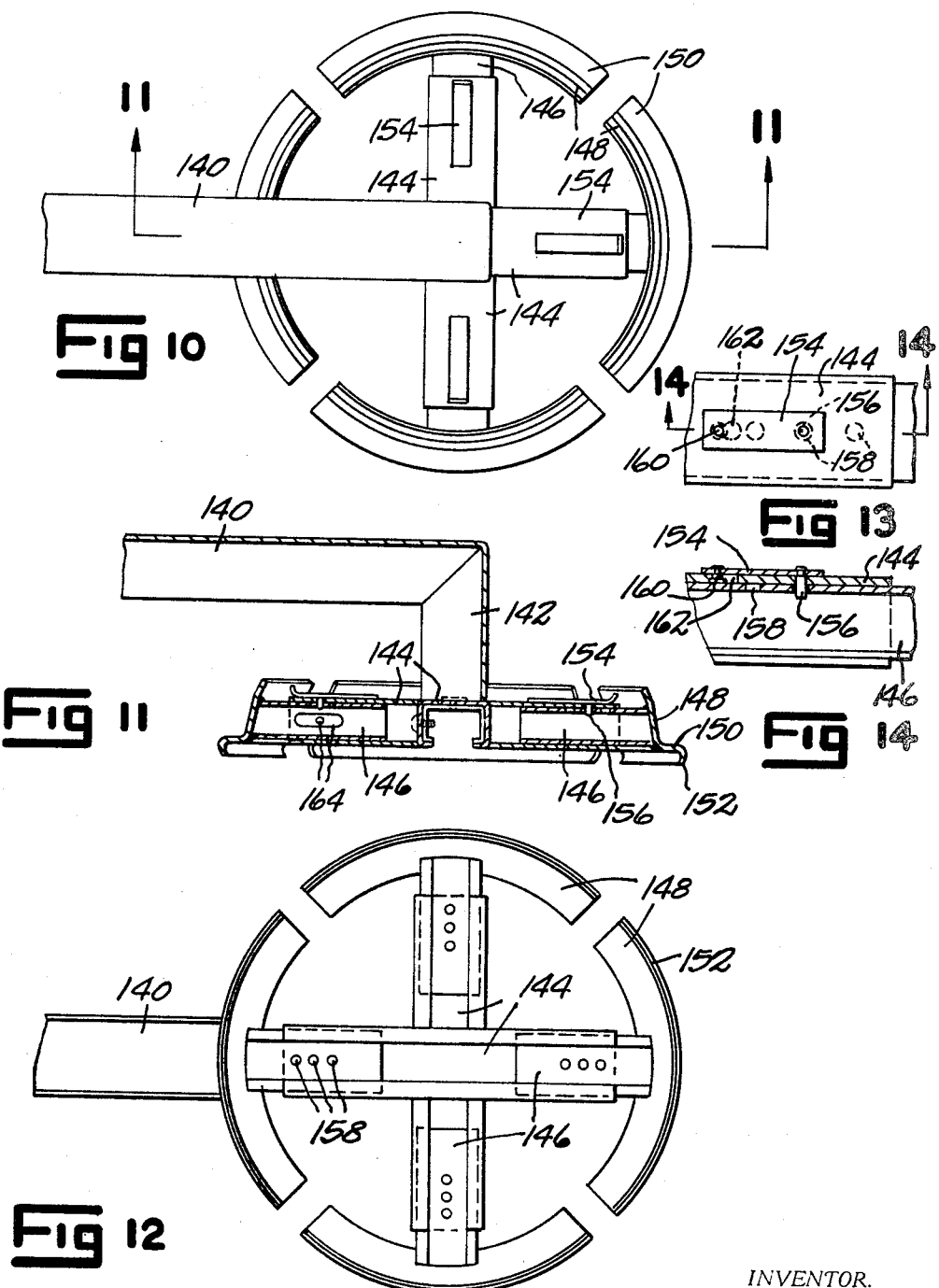

United States Patent Office 3,393,807
Patented July 23, 1968

3,393,807
CARRIER FOR RADIAL GREEN TIRES
Rowland L. Sylvester, Jack H. Morrow, and Carl C. Stevason, South Bend, Ind., assignors to Tecto Corp., a corporation of Indiana
Filed Oct. 20, 1965, Ser. No. 498,208
1 Claim. (Cl. 211—24)

ABSTRACT OF THE DISCLOSURE

A carrier for the horizontal transporting of radial green tires having a frame support, an attached arm supporting an expansible and retractable tire-engaging unit. The tire-engaging unit includes tire suspending members which when inserted into the center of the tire and then expanded provide a lip which circumferentially supports the tire bead thereby holding the green tire in a substantially horizontal position.

This invention relates to carriers for radial green tires having imbedded wire reinforcements in the carcass or body thereof.

Radial green tires are very fragile and are subject to deformation thereof in a manner to cause the reinforcing wires to take a set and thereby prevent the desired accurate construction required to produce a commercially acceptable tire. Inasmuch as such tires are commonly assembled at one point or location and must be transported to another location for curing thereof, it becomes important to insure support of the tires in a manner to avoid distortion thereof after assembly thereof and before curing thereof.

Various types of carriers for radial green tires have been proposed heretofore. Examples of such devices are those shown in Patent 3,147,864, dated Sept. 8, 1964, in which such tires are supported upon prongs, and devices such as shown in the patent application of Rowland L. Sylvester, Ser. No. 443,570, filed Mar. 29, 1965, now Patent 3,322,286, granted May 30, 1967, in which radial green tires are supported on slings. In both of these prior carriers, the radial green tire is supported in a vertical position and is subject to the possibility that it may be caused to take a set slightly out of round prior to curing thereof.

It has been proposed previously to support radial green tires in a horizontal position by resting thereof upon supporting means fitting within the tire and engaged by one bead thereof. Such devices have the advantage of providing substantially continuous circumferential support of the tire, but have the disadvantage of requiring manipulation of the green tire to fit it over the support, and such manipulation may subject the tire to undesired distortion, causing the wire reinforcement thereof to take a set.

This invention pertains to the apparatus for transporting radial green tires and consists of a rigid frame having a lateral arm terminating in a depending vertical member. The depending member includes a carrier means at its lower end. An expansible and retractable tire-engaging unit attached to the depending member is adapted to fit within and support the bead of the green tire in a substantially horizontal position. The tire-engaging unit comprises at least one section having parts shiftable on said depending member and having a portion fitting within the tire bead and an outer substantially arcuate flange underlying and supportedly engaging the tire bead in an extended position.

It is the primary object of this invention to provide a carrier adapted to support a radial green tire in a horizontal position throughout the major portion of its circumferential extent at one bead thereof, and so constructed that the radial green tire may be applied thereto and removed therefrom by manipulation of the carrier in a manner to avoid requirement for distortion of the radial green tire from desired configuration and circular shape.

A further object is to provide a device of this character which will support a plurality of tires in a compact arrangement having clearance with one another and which accommodates application of radial green tires thereto and removal of radial green tires therefrom rapidly and safely.

A further object is to provide a device of this character wherein a carrier having a multiple part horizontally positioned tire bead supporting unit has means for shifting the parts thereof between a retracted position facilitating application of the radial green tire thereto and removal of the radial green tire therefrom and a tire-supporting position extended to a dimension larger than the circular opening defined by the inner margin of a bead of the tire.

A further object is to provide a device of this character which is compact, has a high storage capacity, provides protection for tires thereon without detracting from accessibility for mounting and dismounting of tires, which provides a large extent of circumferential supporting engagement with a tire, which prevents circumferential distortion of tires, which accommodates mounting of tires of different sizes, which is strong and sturdy to permit handling by unskilled labor during transport from place to place, which accommodates stacking for compact storage of large quantities of radial green tires, and which is economical to construct and maintain.

Other objects will be apparent from the following specification.

In the drawings:

FIG. 4 is a top plan view illustrating a modified embodiment of the tire engaging portion of a carrier structure, with parts shown in section taken on line 4—4 of FIG. 5;

FIG. 5 is a vertical sectional view taken on line 5—5 of FIG. 4;

FIG. 6 is a top plan view of a carrier structure utilizing tire-engaging supports of the character illustrated in FIGS. 4 and 5, and taken on line 6—6 of FIG 7;

FIG. 7 is a side elevational view of the carrier structure shown in FIG. 6 arranged in stacked relation to like carrier structures;

FIG. 8 is a horizontal plan view with parts shown in section taken on line 8—8 of FIG. 9, illustrating another embodiment of tire-engaging unit for use in a carrier structure;

FIG. 9 is a side elevational view of the tire-engaging unit illustrated in FIG. 8 in its retracted or tire-releasing position;

FIG. 10 is a top plan view illustrating another embodiment of tire-engaging unit which may be used in my improved carrier structure;

FIG. 11 is a vertical sectional view taken on line 11—11 of FIG. 10;

FIG. 12 is a bottom plan view of the device shown in FIGS. 10 and 11;

FIG. 13 is an enlarged fragmentary plan view of a detail of the construction illustrated in FIGS. 10 to 12;

FIG. 14 is a sectional detail view taken on line 14—14 of FIG. 13.

Figure 1:
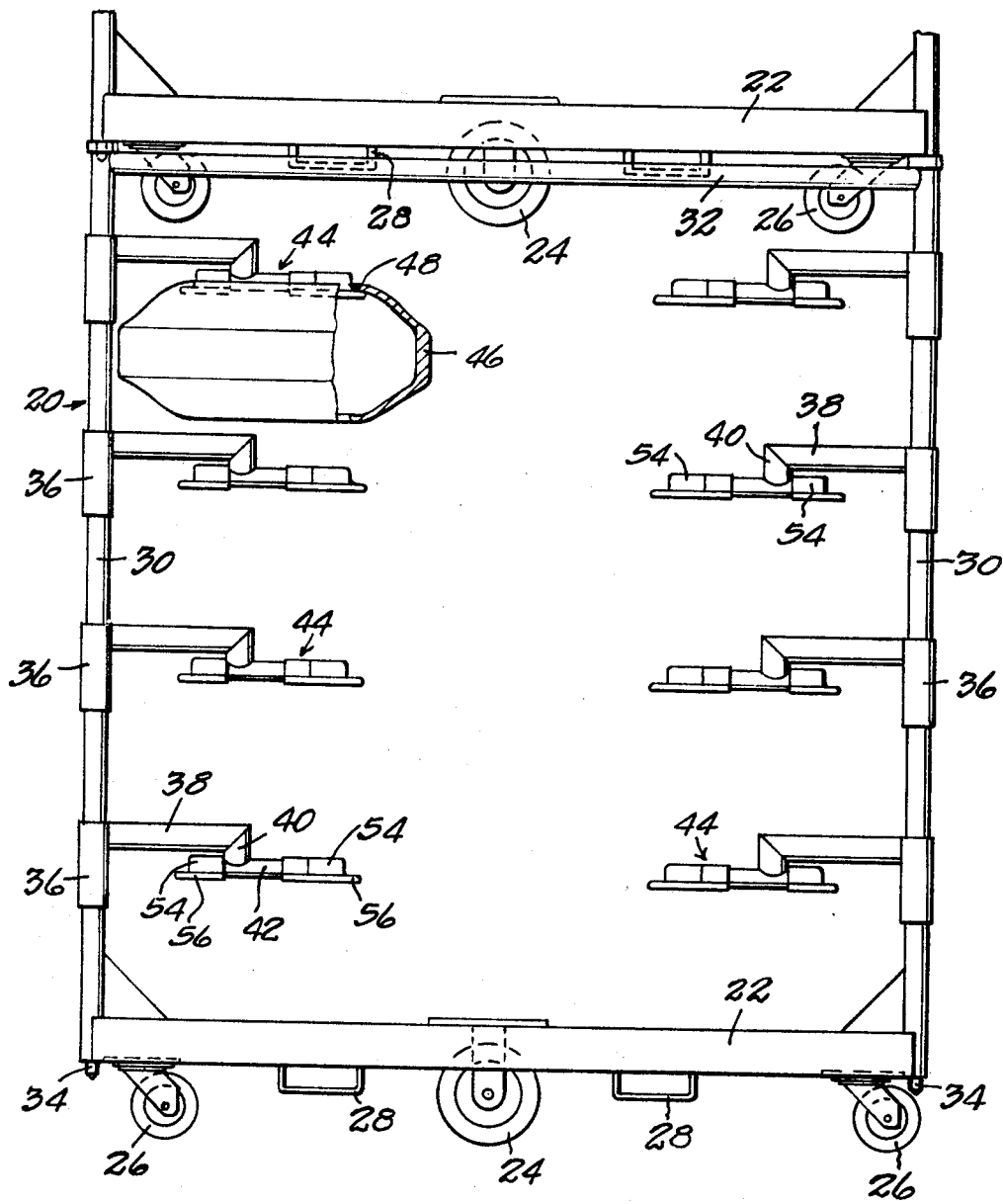
FIG. 1 is a side elevational view of one embodiment of the invention with parts shown in section.

Referring to the drawings, and particularly to FIGS. 1 to 3, which illustrate one embodiment of the invention, the numeral 40 designates a rigid frame or rack of a structure having a base 22 which preferably is mounted upon wheels for ready transport thereof. Thus, as illustrated in FIG. 1, wheels 24 may be mounted to support the frame at its center, and casters 26 may be mounted adjacent the opposite ends of the frame. The base 22 may also carry stirrup portions 28 to receive and position the fork arms of fork lift trucks. The frame 20 preferably includes a plurality of tubular uprights 30 supported on the base structure and interconnected adjacent their upper ends by upper longitudinal and transverse frame members 32. At one end each of the tubular uprights carries a projecting reduced dimension pin portion 34, as shown at the bottom in FIG. 1, which is adapted to fit in the opposite end of the upright of another frame or rack when the frames are stacked, as illustrated in FIG. 1, as by handling the same by means of fork lift trucks.

Each upright 30 carries a plurality of vertically spaced sleeves or journals 36 rotatable upon the upright 30 at selected elevations. A substantially horizontal arm 38 is secured to each journal sleeve 36 and terminates in a depending or downwardly projecting part 40 upon which is fixedly mounted a carrier means such as a substantially horizontal cross-arm 42 intermediate the length of such cross-arm.

Figure 2:
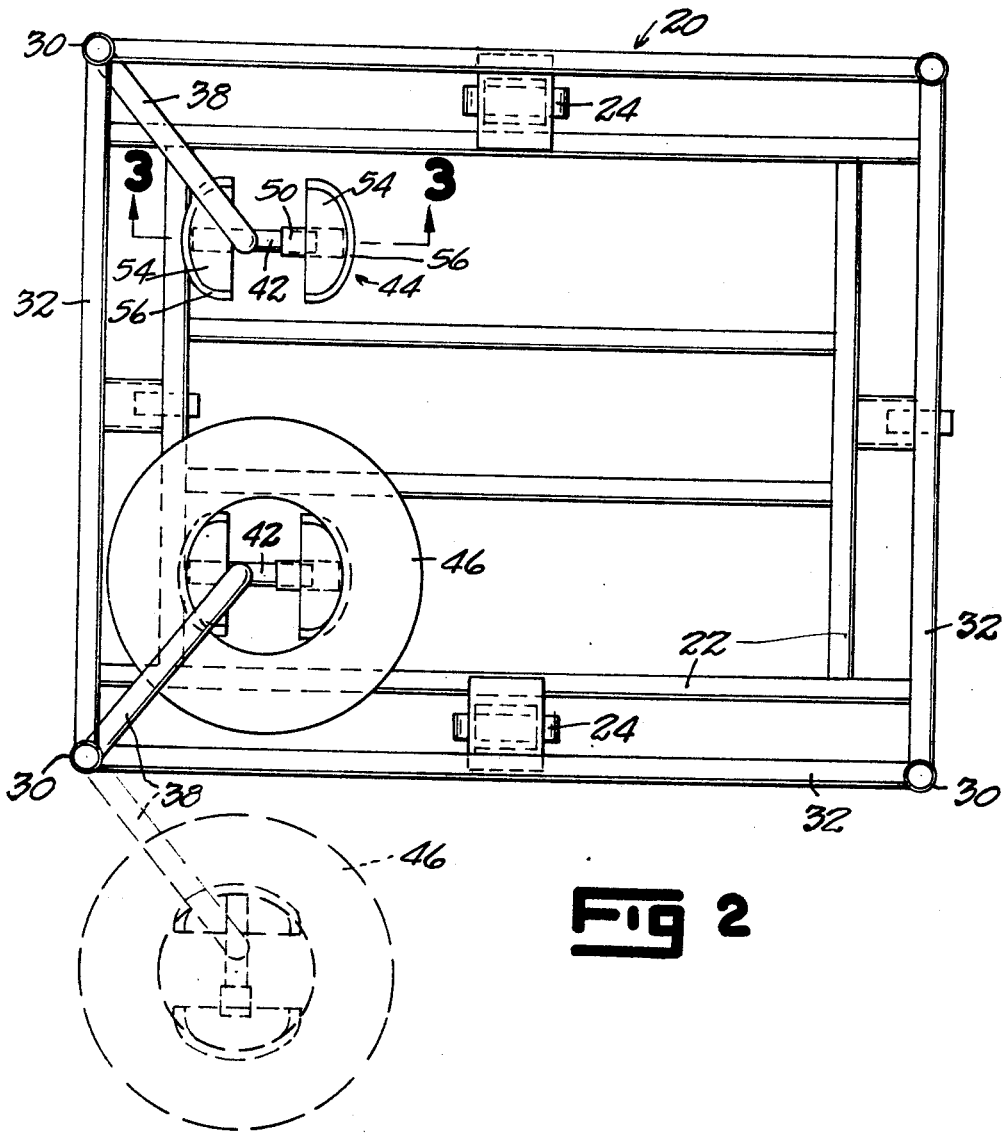
FIG. 2 is a fragmentary top plan view of the device illustrated in FIG. 1.
Figure 3:
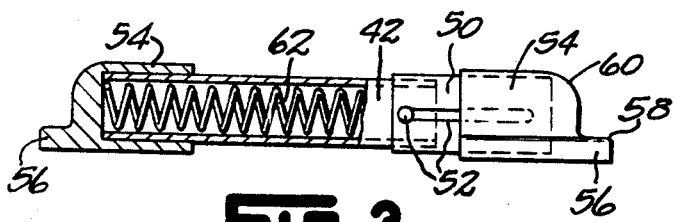
FIG. 3 is an enlarged sectional view taken on line 3—3 of FIG. 2.

Each horizontal cross-arm 42 forms a part of a tire engaging unit 44 which is adapted to support a radial green tire 46 in horizontal position suspended from the uppermost bead portion 48 thereof. One embodiment of the unit 44 utilizes a construction wherein the cross-arm 42 is tubular and mounts slidably thereon a larger telescoping tube 50. A pin and slot connection 52 between the parts 42 and 50 serves to limit longitudinal telescoping movement of the parts 42 and 50 and to prevent relative rotation thereof. Each of the tubes 42 and 50 mounts a generally arcuate section or member 54 extending transversely thereof and adapted to cooperate with a complementary arcuate section 54 to provide support for a large proportion of the circumferences of the bead portion of a radial green tire. Each section 54 has an enlarged flange 56 projecting therefrom at the lower part thereof and of generally arcuate or curved shape, with its upper and outer edge rounded at 58. Similarly rounded at 60 is the contour of the upper portion of the section 54. These rounded edges or surfaces 56 and 58 eliminate sharp corners or rough surfaces which might injure or damage a fragile radial green tire which comes in contact therewith. The width of each section 54 is preferably slightly less than the diameter of a tire at the inner edge of the bead thereof as best seen in FIG. 2. Suitable resilient means are provided in the device to urge it to its expanded tire-supporting position, and such means may constitute a coil spring 62 within the telescoping tubes 42 and 50 and bearing outwardly against sections 54 to normally expand the unit 44 to the limit permitted by the pin and slot connection 52.

The tire-supporting parts of the device are so spaced and proportioned that a plurality of radial green tires may be mounted thereon with sufficient clearance to avoid interference from the frame and from each other. The journal sleeves 36 preferably swing through a selected arc, as between the projecting dotted line loading position illustrated in FIG. 2 and the retracted storage and transport position illustrated in full lines in FIG. 2. The device will accept tires of different sizes within a selected range of sizes, as is made possible by the telescoping movement of the parts 42 and 50 which mount the arcuate sections 54. Thus the tire is readily mounted in the position illustrated in FIG. 1 by pushing upon the slidable tube 50 to retract the parts of unit 44 to such an extent that ample clearance is provided between the enlarged flanges 56 of the sections 54 and the inner edge of the tire bead, so that the tire can be passed around the flange 56. Thereupon release of the slidable carrier section expands the unit 44 to project flanges 56 within the tire to underlie and support the upper bead 48. The strength of the spring 62 will preferably be sufficient to insure expansion of the unit 44 while holding to a minimum the possibility of distortion of the radial green tire to oval or out-of-round condition at the bead at which it is supported. Removal of the tire from the sections 54 is accomplished by sliding the section mounted upon the tube 50 to a retracting position on tube 42 at which the opposed margins of the flanges 56 are spaced apart a distance less than the inner diameter of the tire bead.

Another embodiment of the invention is illustrated in FIGS. 4, 5, 6 and 7. In this embodiment, a rigid frame or rack 70 is provided with a base 72 which is preferably mounted upon wheels or casters 74. A single column 76 projects upwardly from the central portion of the base and a plurality of sets of radial arms 78 project from the column at vertically spaced points. At the bottom of each frame at its center is a socket 80 adapted to interfit with the top portion of the column of an adjacent unit to permit stacking of units. Lateral stability of stacked units is provided by engagement of downwardly projecting members 82 on the base 72 of the stacked rack with the uppermost arms 78 or projections 79 of the lower rack.

A tire-engaging unit 84 is mounted on the outer end of each rack arm 78. In the construction here shown, a T-fitting 86 is mounted on the arm 78 and serves to mount a depending part 88, and also a horizontal arm 90 aligned with arm 78. A plurality of equiangularly extending substantially horizontal arms 92, constituting a carrier means, are affixed or carried by the lower end of the depending part 88 and, as here shown, four such arms 92 are provided, although two or more may be provided. Each horizontal arm 92 mounts slidably thereon an arcuate tire-engaging section 94 characterized by a generally arcuate marginal shoulder 96 and a substantially flat arcute outwardly projecting flange 98 upon which a portion of the inner surface of the bead of a tire may rest, as illustrated in FIG. 7.

A plate 100 is journaled upon the depending part 88 and has pivotally connected thereto, at a plurality of equispaced points 102 spaced from the center thereof, the ends of crank arms 104 whose opposite ends are pivotally connected at 106 to adjacent sections 94. A hand lever 108 is pivoted to plate 100 to bear upon a horizontal plate 110 secured to arm 90 by brackets 112 and having a series of holes 114 therein spaced apart and selectively engageable by a pin 116 carried by the lever.

This device is adapted for use similarly to the embodiment of FIG. 1 and differs therefrom principally with respect to the method of adjustment of the tire-engaging units to and from retracted position in which the sections are drawn inwardly to define an overall outline smaller than the dimension of the opening within a tire so as to accommodate application of a tire thereto or removal of a tire therefrom.

Thus by moving the hand lever 108 and plate 100 in counterclockwise direction, as viewed in FIG. 4, the sections are moved inwardly toward the part 88 as determined by a guide portion 95 provided on each carrier section and slidable upon a horizontal arm 92. After the tire has been positioned properly so that its uppermost bead is above the level of the flanges 98, the lever 108 is moved to rotate the plate 100 in a clockwise direction, thereby causing outward sliding of the guides 95 upon the arms 92 until the desired adjustment is secured at which the flanges 98 will underlie and support the upper tire bead. The various openings 114 may be so correlated that each will provide a setting of the device to accommodate and support a tire of a selected size.

Another embodiment of the invention is illustrated in FIGS. 8 and 9, wherein horizontal arms of a supporting rack or structure, such as arms 78, mount at their free ends depending members 120, such as tubes. Each member 120 carries fixedly at its lower end a carrier means such as a bracket 122 to which is pivotally connected an arm 124 which swings in a vertical path. Each arm mounts an L-shaped part 126 at its free end, having an outwardly projecting flange 128. A link 130 is pivoted at one end thereof to an intermediate portion of each arm 124 and is pivotally connected at its opposite end to a collar or sleeve 132 which is slidable upon the member 120. Suitable resilient means are provided which act normally to swing the arms 124 to an upwardly inclined retracted position, as seen in FIG. 9, and, as here shown, such means constitute coil springs 134 each connected at one end to an outer portion of an arm 124 and at its opposite end to the member 120 adjacent the upper end thereof. Suitable means (not shown) may be provided to limit the downward pivotal movement of the arms 124 at a substantially horizontal position at which the flanges 128 are spaced apart sufficiently to underlie and support the bead of a tire at spaced points. The parts will be so proportioned that the weight of the tire will be sufficient to hold the arms in their extended position and springs 134 will be of sufficient strength to swing the arms 124 upwardly toward the FIG. 9 position as soon as the weight of a tire is relieved therefrom, thereby shifting the flanges 128 inwardly to a spaced relation permitting free movement of a tire relative thereto.

Another construction of tire-engaging unit adapted to be mounted upon the outer end of a laterally projecting supporting arm 140 mounted upon a suitable rack or frame, is shown in FIGS. 10 to 14. Each arm 140 has a depending end part 142 to whose lower end are secured substantially coplanar and radial arms 144, constituting a carrier means, which may be welded or otherwise fixedly secured to one another and to the part 142. The radial arms are preferably tubular, or at least part tubular, and each slidably receives therein a slide member 146 which mounts an arcuate tire-engaging section 148 at its outer end. Each section 148 is preferably of tapered form similar to a part of a cone and has an outwardly projecting arcuate flange terminating in the inwardly downturned flange 152. Any suitable means may be provided to position the slides 146 and sections 148 in selected adjustment upon the radial arms 144, and for this purpose each radial arm may carry a leaf spring 154 from whose free end projects a locking pin 156 seating in a selected one of a series of apertures 158 of the slide member 146. The leaf springs 154 are preferably mounted detachably so as to be readily replaced and, for this purpose, each may carry a headed pin 160 detachably mounted in a keyhole opening 162 of a radial arm 144. If desired, means may be provided to limit the movement of the slide members 146, and such means may constitute a pin-and-slot connection 164, as seen in FIG. 11.

In this embodiment of the invention, some or all of the tire-engaging sections of each unit are slid inwardly to fit freely within a tire for purposes of application of the tire thereto or removal of a tire therefrom, and then are slid outwardly to an extended position at which the flanges 150 underlie and support the uppermost bead of a horizontally positioned tire.

In all embodiments of the invention, the device is characterized by engagement and support of a tire at multiple spaced points, preferably substantially equi-spaced circumferentially and preferably providing a substantial extent of support circumferentially. Thus in each of the embodiments, except that shown in FIGS. 8 and 9, each of the tire-supporting flanges is elongated, and the tire bead is engaged and supported through the major portion of its circumference. In all forms the provision of multiple points of support minimizes the danger of distortion of a radial green tire while supported, that is, minimizes the danger that the reinforcing wires thereof will take a set which will interfere with assumption of the desired shape of the finished tire when the same has been cured. Thus avoidance of distortion occurs both in the plane of the tire and in a direction transverse of the plane of the tire. In all forms, the device is provided with rounded corners or edges at tire-engaging parts, so as to minimize risk of cutting or marring of the uncured rubber.

While the preferred embodiments of the invention have been illustrated and described, it will be understood that changes in construction may be made within the scope of the appended claim without departing from the spirit of the invention.

We claim:

1. A carrier for supporting and storing radial green tires, comprising:

a rigid frame having a lateral arm terminating in a depending substantially vertical member, said depending member including carrier means at its lower end, a laterally expansible and retractable tire-engaging unit mounted on the carrier means of said depending member and adapted to fit within and support a radial green tire at the uppermost bead therof in horizontal position, said tire-engaging unit including a plurality of support sections, at least one support section having a part shiftable laterally and bodily on said carrier means and each section having a portion fitting within a tire bead and an outwardly projecting substantially arcuate and horizontal flange underlying and supportingly engaging the uppermost tire bead throughout its radial dimension in extended position, and in retracted position being positioned in a space of smaller diameter than the inner diameter of said tire bead to accommodate mounting and dismounting of a tire relative to said carrier, said sections having rounded corners and edges at tire-engaging parts thereof, said carrier means constituting a plurality of substantially radially extending arms, and each support section sliding on an arm, one of said interengaging arm and section being tube-like and slidably receiving the other, means cooperating between said arms and said support sections to limit said support sections to predetermined extended and retracted positions, and latch means maintaining said support sections in selected relation to said arms.

References Cited

UNITED STATES PATENTS

| 814,101 | 3/1906 | Weel | 248—187 X |
|---------|--------|------|-----------|
| 1,464,371 | 8/1923 | Sisk | 244—42.29 |
| 1,581,352 | 4/1926 | Kuen | 211—168 |
| 2,010,572 | 8/1935 | Waterman | 211—163 X |
| 2,422,848 | 6/1947 | Peters | 294—97 |
| 2,566,507 | 9/1951 | Walraven et al. | 294—93 |
| 2,997,738 | 8/1961 | Soderquest | 294—93 X |
| 3,103,280 | 9/1963 | Brunig | 211—105.3 |
| 3,131,961 | 5/1964 | Van Doros | 294—97 X |

ROY D. FRAZIER, *Primary Examiner.*